United States Patent
Frank et al.

(10) Patent No.: US 6,887,563 B2
(45) Date of Patent: May 3, 2005

(54) COMPOSITE AEROGEL MATERIAL THAT CONTAINS FIBRES

(75) Inventors: Dierk Frank, Hofheim (DE); Andreas Zimmermann, Griesheim (DE)

(73) Assignee: Cabot Corporation, Billerica, MA (US)

( * ) Notice: Subject to any disclaimer, the term of this patent is extended or adjusted under 35 U.S.C. 154(b) by 0 days.

(21) Appl. No.: 10/304,333

(22) Filed: Nov. 26, 2002

(65) Prior Publication Data

US 2003/0077438 A1 Apr. 24, 2003

Related U.S. Application Data

(63) Continuation of application No. 09/043,137, filed on Jun. 4, 1998, now abandoned.

(30) Foreign Application Priority Data

Sep. 11, 1995 (DE) .......................................... 195 33 564

(51) Int. Cl.[7] .............................. B32B 5/02; B32B 5/16; B32B 5/18
(52) U.S. Cl. ............................... 428/312.6; 428/313.9; 428/316.6; 428/317.9
(58) Field of Search .......................... 428/312.6, 313.9, 428/316.6, 317.9

(56) References Cited

U.S. PATENT DOCUMENTS

| | | | | |
|---|---|---|---|---|
| 3,055,831 A | | 9/1962 | Barnett et al. ................. 252/62 |
| 4,667,417 A | * | 5/1987 | Graser et al. .................. 34/337 |
| 4,954,327 A | * | 9/1990 | Blount ........................ 423/338 |
| 5,569,513 A | * | 10/1996 | Fidler et al. ................ 428/35.6 |
| 5,656,195 A | * | 8/1997 | Mielke et al. ................. 252/62 |
| 5,786,059 A | * | 7/1998 | Frank et al. ................... 428/68 |
| 5,789,075 A | * | 8/1998 | Frank et al. .............. 428/312.6 |
| 5,795,556 A | * | 8/1998 | Jansen et al. ............... 423/338 |

FOREIGN PATENT DOCUMENTS

| | | |
|---|---|---|
| DE | 2941606 A1 | 4/1981 |
| DE | 3346180 A1 | 8/1985 |
| EP | 0057252 A2 | 8/1982 |
| EP | 0340707 A2 | 11/1989 |
| EP | 0618399 A1 | 10/1994 |
| EP | 0672635 A1 | 9/1995 |

* cited by examiner

*Primary Examiner*—Deborah Jones
*Assistant Examiner*—Jason L Savage
(74) *Attorney, Agent, or Firm*—Robert Amici

(57) ABSTRACT

The present invention relates to a composite material that contains 5 to 97%-vol aerogel particles, at least one binder, and at least one fibre material, the diameter of the aerogel particles being $\geq 0.5$ mm, a process for manufacturing this, and the use thereof.

23 Claims, No Drawings

COMPOSITE AEROGEL MATERIAL THAT CONTAINS FIBRES

This application is a continuation of U.S. Ser. No. 09/043,137, filed Jun. 4, 1998, now abandoned.

The present invention relates to a composite material that contains 5 to 97%-vol of aerogel particles, at least one binder, and at least one fibre material, the diameter of the aerogel particles being $\geq 0.5$ mm, a process for manufacturing this, and the use thereof.

Because of their very low density, great porosity, and small pore diameters, aerogels, in particular those with a porosity of over 60% and densities of less than 0.4 g/cm3, display an extremely low thermal conductivity and for this reason are used as thermal insulation materials, as described in EP-A-O 171 722, for example.

However, their high level of porosity leads to a low mechanical stability, both of the gel from which the aerogel is dried, and of the dried aerogel itself.

In the broadest sense, i e., when regarded as "gels with air as the dispersant," aerogels are manufactured by drying a suitable gel. When used in this sense, the term "aerogel" includes aerogels in the narrower sense, such as xerogels and cryogels. A gel is designated as an aerogel in the narrower sense if the liquid is removed from the gel at temperatures above the critical temperature and starting from pressures that are above the critical pressure. In contrast to this, if the liquid is removed from the gel sub-critically, for example with the formation of a liquid-vapour boundary phase, then the resulting gel is, in many instances, referred to as xerogel. It should be noted that the gels according to the present invention are aerogels in the sense that they are gels with air as the dispersant.

The process that shapes the aerogel is concluded during the sol-gel transition. Once the solid gel structure has been formed, the external shape can only be changed by size reduction, for example, by pulverizing. The material is too brittle for any other form of stress.

For many applications, however, it is necessary to use the aerogel in certain shapes. In principle, the production of moulded parts is possible even as the gel is being formed. However, the replacement of solvents that is governed by diffusion (with respect to aerogels, see, for example, U.S. Pat. No. 4,610,863 and EP-A 0 396 0761; with respect to aerogel composite materials, see, for example, WO 93/06044), and the drying—which is similarly governed by diffusion—lead to production times that are economically unacceptable. For this reason, it is appropriate to carry out a shaping stage after the production of the aerogel, which is to say, after it has been dried, and to do this without any essential change of the internal structure of the aerogel taking place with respect to the particular application.

For many applications, however, it in addition to good thermal insulation, an insulating material is also required to provide good insulation against airborne sound. Typically, good acoustic insulation is found in porous materials, the porosity of which lies on a macroscopic scale (greater than 0.1 $\mu$m) for then the velocity waves of the sound are attenuated by friction of the air on the walls of the pores. For this reason, monolithic materials without any macroscopic porosity display only a very low level of acoustic damping. If a material is only porous on a microscopic scale, as is the case with monolithic aerogels, the air cannot flow through the pores; rather, the sound waves are transmitted on to the structure of the material and this then conducts them with out any marked attenuation.

DE-A 33 46 180 describes rigid panels from moulded bodies based on silicic acid aerogel obtained by flame pyrolysis combined with reinforcement by long mineral fibres. However, this silicic acid aerogel that is extracted from flame pyrolysis is not an aerogel in the above sense since it is not manufactured by drying a gel, and for this reason it has a completely different pore structure. Mechanically, it is much more stable and for this reason can be pressed without out destruction of the microstructure, although it has a greater thermal conductivity than typical aerogels in the above sense. The surface of a moulded body such as this is extremely delicate and for this reason must be hardened, as by the use of a binder, or by being covered with a film.

EP-A-O 340 707 describes an insulating material with a density from 0.1 to 0.4 g/cm3 that consists of at least 50%-vol silica aerogel particles with a diameter between 0.5 and 5 mm, that are connected by means of at least one organic and/or inorganic binder. If the aerogel particles are connected by the binder only on the contact surfaces, the insulating material that results is not very stable in the mechanical sense since, under mechanical stress, the part of the aerogel particle that is covered with the binder tears off, so that the particle is no longer connected and the insulating material becomes cracked. For this reason, as nearly as possible all the gaps between the aerogel particles should be filled with the binder. In the case of very small proportions of binder, the resulting material is as stable as pure aerogels although cracks can occur very easily if all the grains of the granulate are not sufficiently enclosed by the binder.

In the case of a high volumetric percentage of binder that is favourable for achieving a low degree of thermal conductivity, only very small proportions of the binder will remain in the spaces between the particles and, especially in the case of porous binders such as foams with lower thermal conductivity, this will result in low mechanical stability. In addition, because of reduced macroscopic porosity (between the particles), filling all the intervening spaces with binder causes markedly reduced acoustic damping within the material.

EP-A-489 319 describes a composite foam with a low level of thermal conductivity, which contains 20 to 80%-vol of silica aerogel particles, 20 to 80%-vol of a styrene polymer foam with a density of 0.01 to 0.15 g/cm3 that encloses the aerogel particles and connects them to each other, and, if necessary, effective quantities of the usual additives. The composite foam that is produced in this way is resistant to compression but is not very rigid at high concentrations of aerogel particles.

German patent applications DE-A 44 30 669 and DE-A-44 30 642 describe panels or mats of a fibre-reinforced aerogel. Is it is true that, because of the very high proportion of aerogel, these panels or mats display a very low level of thermal conductivity, but they require relatively protracted production times because of the above-described diffusion problems.

The as-yet unpublished German patent application P 44 45 771.5 describes a non-woven fibre textile-aerogel composite material that has at least one layer of non-woven fibre textile and aerogel particles, and is characterised in that the non-woven fibre textile contains at least one binary fibre material, the fibres of which are connected to each other and to the aerogel particles by the low melting-point covering material. This composite material has a relatively low level of thermal conductivity and a high level of macroscopic porosity and, because of this, good acoustic damping, although the temperature range in which the material can be used, and its fire rating, are restricted by the use of binary fibres. In addition, the corresponding composite materials, in particular complex moulded bodies, are not simple to manufacture.

For this reason, one of the tasks of the present invention was to produce a composite material that is based on aerogel granulate, that has a lower level of thermal conductivity, and is both mechanically stable and easy to manufacture.

A further task of the present intention was to produce a composite material that is based on aerogel granulate, and that additionally displays good acoustic damping characteristics.

This task is solved by a composite material that contains 5 to 97%-vol aerogel particles, at least one binder, and at least one fibre material, the diameter of the aerogel particles being $\geq 0.5$ mm.

The fibres or aerogels are either connected to each other and with each other by the binder, or the binder serves as a matrix material in which the fibres and the aerogel particles are embedded. Connection of the fibres and the aerogel particles to each other and with each other by the binder and, optionally, including them in a binder matrix, results in a mechanically stable material of very low thermal conductivity.

In contrast to a material that consists solely of aerogel particles that are connected by their surfaces or embedded in a matrix of adhesive, most surprisingly, even small proportions of fibres by volume can result in significant mechanical strengthening, given an equal proportion of binder by volume, since they assume large part of the load. If a greater volume of fibres is used with only a small amount of binder, it is possible to obtain a porous material in which the fibres that are connected by the binder form a mechanically stable structure within which the aerogel particles are embedded. The air pores that then result lead to a higher level of porosity, and thus to improved acoustic damping.

Natural fibres such as cellulose, cotton, or flax fibres, as well as synthetic fibres, can be used as the fibre material; with respect to synthetic fibres, it is possible to use inorganic fibres such as glass fibres, mineral fibres, silicon carbide fibres or carbon fibres; and to use polyester fibres, polyamide fibres, or polyaramid fibres as organic fibres. The fibres can be new, or waste material such as shredded glass-fibre waste or waste rags.

The fibres can be straight or crimped, and be in the form of individual fibres, wadding, or a non-woven or woven fibre material. Non-woven fibre material and/or textiles can be contained in the binder in the form of a cohesive whole and/or in the form of a number of smaller pieces.

The fibres can be round, trilobal, pentalobal, octalobal, in the form of strips, or be shaped like fir trees, dumb bells, or otherwise. Hollow fibres can also be used.

The diameter of the fibres that are used in the composite material should preferably be smaller than the mean diameter of the aerogel particles, so that a high proportion of aerogel is bound into the composite material. The selection of very fine fibres makes the composite material slightly flexible.

It is preferred that fibres with diameters that are between 0.1 $\mu$m and 1 mm are used. Typically, in the case of fixed proportions of fibres by volume, the use of smaller diameters results in composite materials that are more resistant to breakage.

There are no restrictions on the lengths of the fibres. Preferably, however, the lengths of the fibres should be greater than the mean diameter of the aerogel particles, i.e., at least 0.5 mm.

In addition, mixtures of the above types can be used.

The stability and the thermal conductivity of the composite material increase as the proportion of fibres increases. The volumetric percentage of the fibres should preferably by between 0.1 and 40%-vol, and in particular in the range between 0.1 and 15%-vol, depending on the application.

In order to enhance the way in which they bind into the matrix, the fibres can be coated with sizing or coupling agents, as is typically done in the case of glass fibres.

Suitable aerogels for the composition according to the present invention are those based on metallic oxides, which are suitable for the sol-gel technique (C. J. Brinker, G. W. Scherer, Sol-Gel Science. 1990, Chaps. 2 and 3), for example, Si or Al compounds or such as those based on organic substances that are suitable for the sol-gel technique, such as melamine-formaldehyde condensates (U.S. Pat. No. 5,086,085) or resorcinformaldehyde condensates (U.S. Pat. No. 4,873,218). They can also be based on mixtures of the above-cited materials. It is preferred that aerogels containing Si compounds, especially $SiO_2$ aerogels, and in particular $SiO_2$ aerogels, be used.

The aerogel can contain IR opacifiers, such as soot, titanium dioxide, iron oxide, or zirconium dioxide, as well as mixtures of these, in order to reduce the radiation contribution to thermal conductivity.

Furthermore, the thermal conductivity of the aerogels decreases as porosity increases and density decreases; this applies down to densities in the vicinity of 0.1 g/cm$^3$. For this reason, aerogels with porosities of greater than 60% and densities between 0.1 and 0.4 g/cm$^3$ are especially preferred. It is preferred that the thermal conductivity of the aerogel granulate be less than 40 mW/mK, and in particular less than 25 mW/mK.

In a preferred embodiment, hydrophobic aerogel particles are used; these can be obtained by incorporating hydrophobic surface groups on the pore surfaces of the aerogels during or after production of the aerogels.

In the present application, the term "aerogel particles" is used to designate particles that are either monolithic, i.e., are composed of one piece, or, essentially, aerogel particles with a diameter that is smaller than the diameter of the particles that are joined by a suitable binder and/or compressed to form a larger particle. The size of the grains will depend on the use to which the material is put. In order to achieve a higher level of stability, the granulate should not be too coarse, and it is preferred that the diameter of the grains be smaller than 1 cm and, in particular, smaller than 5 mm.

On the other hand, the diameter of the aerogel particles should be greater than 0.5 mm in order to avoid the difficulties associated with handling a very fine powder of low density. In addition, as a rule, during processing, the liquid binder penetrates into the upper layers of the aerogel that, in this area, loses its great effectiveness as insulation. For this reason, the proportion of macroscopic particle surface to particle volume should be as small as possible, which would not be the case were the particles too small.

In order to achieve low thermal conductivity, on the one hand and, on the other, to achieve adequate mechanical stability of the composite material, the volumetric percentage of aerogel should preferably by between 20 and 97%-vol, and especially between 40 and 95%-vol, with greater volumetric percentages leading to lower thermal conductivity and strength. In order to achieve a high level of porosity of the overall material, and enhanced acoustic absorption, air pores should be incorporated in the material, to which end the volumetric percentage of aerogel should preferably be less than 85%-vol.

Granulate with a favourable bimodal grain size distribution can be used to achieve a high volumetric percentage of aerogel. Other distributions could also be used, depending on the application, e.g., in the area of acoustic damping.

The fibres or aerogel particles are connected to each other and the fibres and aerogel particles are connected to each other by at least one binder. The binder can either serve only to join the fibres and aerogel particles to each other and with each other, or can serve as matrix material.

In principle, all known binders are suitable for manufacturing the composite materials according to the present invention. Inorganic binders such as water glass adhesive, or organic binders or mixtures thereof can be used. The binder can also contain additional inorganic and/or organic components.

Suitable organic binders are, for example, thermoplastics such as polyolefins or polyolefin waxes, styrene polymers, polyamides, ethylenevinylacetate copolymers or blends thereof, or duroplasts such as phenol, resorcin, urea, or melamine resins. Adhesives such as fusion adhesives, dispersion adhesives (in aqueous form, e.g., styrene butadiene, and styrene acryl ester copolymers), solvent adhesives or plastisols can also be used; also suitable are reaction adhesives, e.g., in the form of unary systems such as heat-hardened epoxy resins, formaldehyde condensates, polyimides, polybenzimidazoles, cyanacrylates, polyvinylbutyrals, polyvinyl alcohols, anaerobic adhesives, polyurethane adhesives, and moisture hardened silicones, or in the form of binary systems such as methacrylates, cold-hardened epoxy resins, binary silicones and cold-hardened polyurethanes.

It is preferred that polyvinylbutyrals and/or polyvinyl alcohols be used

It is preferred that the binder be so selected that if it is in liquid form during specific phases of the processing, within this time frame it cannot penetrate into the very porous aerogel, or can do so to only an insignificant extent. Penetration of the binder into the interior of the aerogel particles can be controlled by the selection of the binder and by regulating processing conditions such as pressure, temperature, and mixing time.

If the binder forms a matrix in which the aerogels and fibres are embedded, then, because of their low thermal conductivity, porous materials with densities of less than 0.75 g/cm$^3$, such as foams, preferably polymer foams (e.g., polystyrene or polyurethane foams) are used.

In order to achieve the good distribution of the binder in the interstices when large proportions of aerogel are used, and in order to achieve good adhesion, in the event that a solid form of binder is used, the grains of the binder should preferably be smaller than those of the aerogel granulate. Processing at greater pressure may also be required.

If the binder has to be processed at elevated temperatures, as in the case of fusion adhesives or reaction adhesives such as, for example, melamineformaldehyde resins, then the binder must be so selected that its fusion temperature does not exceed the fusion temperature of the fibres.

In general, the binder is used at a rate of 1 to 50%-vol of the composite material, preferably at a rate of 1 to 30%-vol. The selection of the binder will be governed by the mechanical and thermal demands placed on the composite material, as well as requirements with respect to fire protection.

The binder can also contain effective quantities of other additives such as, for example, colouring agents, pigments, extenders, fire retardant agents, synergists for fire protection agents, anti-static agents, stabilizers, softeners, and infra-red opacifiers.

In addition, the composite material can also contain additives that are used to manufacture it or which are formed when it is manufactured; such substances can include slip agents for compression, such as zinc stearate, or the reaction products formed from acid or acid-cleaving hardening accelerators, when resins are used.

The fire rating of the composite material is determined by the fire ratings of the aerogel, the fibres, and the binder, and—optionally—by that of the other substances contained in it. In order to arrive at the most favourable fire rating for the composite material, non-flammable fibres such as glass or mineral fibres, or fibres that are difficult to ignite, such as TREVIRA CS®, or melamine resin fibres, aerogels based on inorganic substanes, preferably based on $SiO_2$, are used; also used are binders that are difficult to ignite, such as inorganic binders of urea and melamineformaldehyde resins, silicon resin adhesives, polyimide and polybenzimidazol resins.

If the material is used in the form of flat structures such as panels or mats, these can be covered on at least one side with at least one covering layer in order to improve its surface properties, and to make it more robust, form it as a vapour barrier, or protect it against soiling. These covering layers can also enhance the mechanical stability of moulded parts made from the composite material. If covering layers are used on both sides, these can either be identical or different.

All materials known to the practitioner skilled in the art are suitable for use as covering layers. They can be non-porous and thereby act as a vapour barrier, e.g., plastic films, preferably metal films, or metallized plastic films that reflect thermal radiation. It is also possible to use porous covering layers such as porous films, papers, textiles, or non-woven fabrics that permit air to penetrate into the material and thereby enhance its acoustic damping properties.

The covering layers can themselves consist of a plurality of layers. The covering layers can be secured with the binder that joins the fibres and the aerogel particles to each other and with each other, although another, different adhesive can also be used.

The surface of the composite material can be also be sealed and consolidated by incorporating at least one suitable material into a surface layer.

Suitable materials are thermoplastic polymers such as polyethylene and polypropylene, or resins such as melamineformaldehyde resins.

It is preferred that the composite materials according to the present invention have a thermal conductivity that is between 10 and 100 mW/mK, especially in the range from 10 to 50 mW/mK, and in particular in the range from 15 to 40 mW/mK.

A further task of the present invention was to provide for a process to manufacture the composite materials according to the present invention.

If the binder is initially in the form of a powder that fuses at an elevated temperature and, if necessary, at an elevated pressure and then reacts, as in the case of reaction adhesives, then the composite material can be obtained as follows: aerogel particles, fibre material, and the binder are mixed using conventional mixers. The mixture is then subjected to a shaping process. The mixture will be hardened in the mould by heating, if necessary under pressure, depending on the type of binder, e.g., in the case of reaction adhesives, or in the case of fusion adhesives by being heated to a point above the melting point of the binder. A material that is porous on a macro scale can be obtained, in particular, according to the following procedure: in the event that the fibres are not already in the form of wadding (e.g., small tufts of cut fibres or small pieces of a film) it will be processed to form small tufts by methods familiar to the practitioner skilled in the art. Even in this step it is, if necessary, possible to incorporate the aerogel granulate between the fibres. Subsequently, these tufts together with the binder and, optionally, the aerogel particles, are mixed, for example in a mixer, until such time as the binder and, optionally, the aerogel particles are distributed as evenly as possible between the fibres. The compound is then placed in a mould and, if necessary under pressure, heated to a temperature that, in the case of fusion adhesives, is above the fusion temperature of the adhesive and, in the case of reaction adhesives, is above the temperature that is required for the reaction. Once the binder has fused or has reacted, the material is cooled. It is preferred that polyvinylbutyrals are used here. The density of the composite material can be increased by using a higher pressure.

In one preferred embodiment, the mixture is compressed. When this is done, the practitioner skilled in the art can select the press and the pressing die that are best suited for the particular application. If necessary, the practitioner can add known slip agents such as zinc stearate to the pressing process when melamineformaldehyde resins are used. The use of vacuum presses is particularly advantageous because of the large amount of air in the moulding compound that contains aerogels. In a preferred embodiment, the moulding compound that contains the aerogel is compressed to form panels. In order to avoid the compound baking onto the pressure ram, the mixture that contains the aerogel and which is to be compressed can be separated from the pressure ram by release paper. The mechanical strength of the panels that contain the aerogel can be enhanced by laminating mesh fabrics, non-woven fabrics, or papers onto the surface of the panel. These mesh textiles, non-woven fabrics, or papers can be applied to the panels that contain aerogel subsequently, in which case the mesh fabrics, non-woven textiles, or papers are previously impregnated with suitable binder or adhesive, and then bonded to the surface of the panel in a heated press when under pressure. In addition, in one preferred embodiment, this can be done in one step by laying up the mesh textiles, non-woven textiles, and paper, optionally previously impregnated with a suitable binder or adhesive, in the press mould and applying them to the moulding compound that contains the aerogel and which is to be pressed, and then subjecting them to pressure and elevated temperatures to form a composite panel that contains aerogels.

Depending on the binder that is used, in any moulds, the pressing generally takes place at pressures from 1 to 1000 bar and at temperatures from 0 to 300° C.

In the case of phenol, resorcin, urea, and melamineformaldehyde resins, pressing preferably takes place at pressures from 5 to 50 bar, especially at 10 to 20 bar, and at temperatures preferably from 100 to 200° C., especially from 130 to 190° C., and in particular between 150 and 175° C.

If the binders is initially in liquid form, the composite material can be obtained in the following way: the aerogel particles and the fibre material are mixed using conventional mixers. The mixture so obtained is then coated with the binder, for example, by spraying, placed in a mould, and then hardened in this mould. Depending on the type of binder that is used, the mixture is hardened under pressure by heating and/or by evaporating off the solvent or dispersant that is used. It is preferred that the aerogel particles be swirled with the fibres in a flow of gas. A mould is then filled with the mixture, with the binder being sprayed on during the filling process. A material that is porous on a macro scale can be obtained in the following way: in the event that the fibres are not already in bulked form (e.g., small tufts of cut fibre or small pieces of a non-woven fabric), they are processed into small tufts using methods that are familiar to the practitioner skilled in the art. Even in this step the aerogel granulate can, if necessary, be incorporated between the fibres. Otherwise, these tufts are mixed with the aerogel granulate in a mixer until the aerogel particles have been distributed as evenly as possible between the fibres. In this step, or subsequently, the binder is sprayed, divided as finely as possible, onto the mixture and the mixture is then placed in a mould and heated—if necessary under pressure—to the temperature that is required for bonding. Subsequently, the composite material is dried using a conventional process.

If a foam is used as binder, the composite material can be produced as follows, depending on the type of foam that is used.

If the foam is manufactured in a mould by the expansion of expandable granulate grains, as in the case of expanded polystyrene, all the components can be thoroughly mixed and then typically heated, advantageously by means of hot air or steam. Because of the expansion of the particles, the pressure in the mould increases, which means that the interstices are filled with foam and the aerogel particles are fixed in the composite. After cooling, the moulded part of composite material is removed from the mould and dried, should this be necessary.

If the foam is manufactured by extrusion or expansion of a non-viscous mixture, with subsequent solidification, the fibres can be mixed into the liquid. The aerogel particles are mixed into the resulting liquid, which then foams.

If the material is to be provided with a covering layer, this can then be laid up in a mould, prior to or after the filling process, so that coating and shaping can take place in one step, with the binder used for the composite material also being used as binder for the coating. However, it is also possible to provide the composite material with a covering layer in a subsequent step.

The shape of the moulded part that consists of the composite material according to the present invention is in no way restricted; in particular, the composite material can be formed into panels.

Because of the high percentage of aerogel and their low thermal conductivity, the composite materials are particularly well suited as thermal insulation.

Formed into panels, the composite material can be used as sound absorbing material, either directly in or in the form of resonance absorbers for acoustic insulation. In addition to the damping of the aerogel material, depending on the porosity that results from macroscopic pores, additional damping is provided as a result of air friction on these macroscopic pores in the composite material. The macroscopic porosity can be regulated by changing the proportion of fibres and their diameter, the grain size and proportion of aerogel particles, and the type of binder. The frequency function of acoustic damping and its degree can be changed by selection of the covering layer, the thickness of the panel, and its macroscopic porosity, which is done in a manner known to the practitioner skilled in the art.

Because of its macroscopic porosity and, in particular, its great porosity, and the specific surface of the aerogel, the composite materials according to the present invention are also suitable as adsorption materials for liquid, vapours, and gasses.

The present invention will be described in greater detail below on the basis of exemplary embodiments without, however, being restricted to these:

EXAMPLE 1

Moulded part of aerogel, polyvinylbutyral, and fibres 90%-vol hydrophobic aerogel granulate, 8%-vol Mowital®

(Polymer F) polyvinylbutyral powder and 2%-vol Trevira® high-strength fibres are thoroughly mixed.

The hydrophobic aerogel granulate has an average grain size in the range from 1 to 2 mm, a density of 120 kg/m$^3$, a BET surface of 620 m$^2$/g and a thermal conductivity of 11 mW/mK.

The bottom of the press mould, with a base area of 30 cm×30 cm, is covered with release paper. The moulding material that contains the aerogel is applied evenly to this, and the whole is then covered with release paper, after which it is pressed to a thickness of 18 mm at 220° C. for a period of 30 minutes.

The moulded part obtained in this way has a density of 269 kg/m$^3$ and a thermal conductivity of 20 mW/mK.

EXAMPLE 2

Moulded part of aerogel, polyvinylbutyral, and recycling fibres 80%-vol hydrophobic aerogel granulate as described in Example 1, 10%-vol Mowital® (Polymer F) polyvinylbutyral powder and 10%-vol of coarsely shredded polyester fibre remnants as the recycling fibres are thoroughly mixed.

The bottom of the press mould, with a base area of 30 cm×30 cm, is covered with release paper. The moulding material that contains the aerogel is applied evenly to this, and the whole is then covered with release paper, after which it is pressed to a thickness of 18 mm at 220° C. for a period of 30 minutes.

The moulded part obtained in this way has a density of 282 kg/m$^3$ and a thermal conductivity of 25 mW/mK.

EXAMPLE 3

Moulded part of aerogel, polyvinylbutyral, and recycling fibres 50%-vol hydrophobic aerogel granulate as described in Example 1, 10%-vol Mowital® (Polymer F) polyvinylbutyral powder and 40%-vol of coarsely shredded polyester fibre remnants as the recycling fibres are thoroughly mixed.

The bottom of the press mould, with a base area of 30 cm×30 cm, is covered with release paper. The moulding material that contains the aerogel is applied evenly to this, and the whole is then covered with release paper, after which it is pressed to a thickness of 18 mm at 220° C. for a period of 30 minutes.

The moulded part obtained in this way has a density of 420 kg/m$^3$ and a thermal conductivity of 55 mW/mK.

EXAMPLE 4

Moulded part of aerogel, polyethylene wax, and fibres 60%-wt of hydrophobic aerogel granulate as described in Example 1, and 38%-wt Ceridust® 130 polyethylene wax powder, and 2%-vol Trevira® high strength fibres are thoroughly mixed.

The bottom of the press mould, with a base area of 12 cm×12 cm, is covered with release paper The moulding material, which contains the aerogel, is applied evenly to this, and the whole is then covered with release paper. A pressure of 70 bar is applied at 170° C. for 30 minutes.

The moulded part obtained in this way has a thermal conductivity of 25 mW/mK

EXAMPLE 5

Moulded part of aerogel, polyethylene wax, and fibres 50%-wt of hydrophobic aerogel granulate as described in Example 1, and 48%-wt Hoechst-Wachs PE 520 polyethylene wax powder, and 2%-vol Trevira® high strength fibres are thoroughly mixed.

The bottom of the press mould, with a base area of 12 cm×12 cm, is covered with release paper The moulding material, which contains the aerogel, is applied evenly to this, and the whole is then covered with release paper. A pressure of 70 bar is applied at 180° C. for 30 minutes.

The moulded part obtained in this way has a thermal conductivity of 28 mW/mK

EXAMPLE 6

Moulded part of aerogel, polyvinylalcohol, and fibres 90%-wt of the hydrophobic aerogel granulate as described in Example 1, 8%-wt of a polyvinylalcohol solution, and 2%-vol Trevira® high strength fibres are thoroughly mixed. The polyvinylalcohol solution consists of 10%-wt Type 40-88 Mowiol®, 45%-wt water, and 45%-wt ethanol.

The bottom of the press mould, with a base area of 12 cm×12 cm, is covered with release paper. The moulding material that contains the aerogel is applied evenly to this, and the whole is then covered with release paper, after which it is pressed at a pressure of 70 bar for a period of 2 minutes, and then dried The moulded part obtained in this way has a thermal conductivity of 24 mW/mK.

The thermal conductivity of the aerogel granulates was measured by a hot-wire method (see, for example, O. Nielsson, G. Rüschenpöhler, J. Groβ, J. Fricke, *High Temperatures-High Pressures*, Vol. 21, pp. 267–274 (1989)). The thermal conductivity of the moulded parts was established in accordance with DIN 52612.

What is claimed is:

1. A composite material containing 5 to 97 vol % of hydrophobic aerogel particles, wherein the aerogel particles are SiO$_2$-aerogels and wherein the porosity of the aerogel particles is greater that 60%, their density is lower than 0.4 g/cm$^3$, and their thermal conductivity is less than 40 mW/mK, at least one polymeric or inorganic binder selected from the group consisting of water glass binders, thermoplastic plastics, thermosetting plastics or adhesives, and at least one fiber material, the diameter of the aerogel particles being greater than or equal to 0.5 mm.

2. The composite material as defined in claim 1, wherein the percentage volume of the fiber material is 0.1 to 40 vol %.

3. The composite material as defined in claim 1, wherein the fiber material contains glass fibers as the principal component.

4. The composite material as defined in claim 1, wherein the fiber material contains organic fibers as the principal component.

5. The composite material as defined in claim 1, wherein the proportion of aerogel particles is in the range from 20 to 97 vol %.

6. The composite material as defined in claim 1, wherein the aerogel is an SiO$_2$ aerogel obtained by incorporating hydrophobic surface groups on the pore surfaces.

7. The composite material as defined in claim 1, wherein the binder as of a density that is smaller than 0.75 g/cm$^3$.

8. The composite material as defined in claim 1, wherein the binder contains an inorganic binder as the primary component.

9. The composite material as defined in claim 8, wherein the inorganic binder is water glass.

10. The composite material as defined in claim 1, wherein the binder contains a polymeric binder as the principal component.

11. The composite material as defined in claim 10, wherein the polymeric binder is polyvinylbutyral and/or polyvinylalcohol.

12. The composite material as defined in claim 1, wherein at least some of the aerogel particles and/or binder contain at least one infra-red opacifier.

13. The composite material as defined in claim 1, wherein the composite material is of a flat shape and is covered on at least one side with at least one covering layer.

14. A process for manufacturing the composite material as defined in claim 1, wherein the aerogel particles and the fiber materials are mixed with the binder, and the mixture is subjected to shaping and hardening.

15. A molded part containing the composite material as defined in claim 1.

16. A molded part as defined in claim 15, wherein the molded part is in the form of a panel.

17. A molded part, consisting essentially of the composite material as defined in claim 1.

18. A composite material consisting essentially of 5 to 97 vol % of hydrophobic aerogel particles, at least one binder, at least one fiber material, and optionally any one or more of: a sizing agent, a coupling agent, an IR opacifier, colouring agents, pigments, extenders, fire retarding agents, synergists for fire protection agents, anti-static agents, stabilizers, softeners, slip agents, and hardening accelerators, wherein the diameter of the aerogel particles is greater than or equal to 0.5 mm.

19. The composite material of claim 18, wherein the aerogel particles comprise $SiO_2$-aerogels.

20. The composite material of claim 18, wherein the porosity of the aerogel particles is greater that 60%, their density is lower than 0.4 g/cm$^3$, and their thermal conductivity is less than 40 mW/mK.

21. The composite material of claim 18, wherein the binder is a polymeric binder or an inorganic binder.

22. The composite material of claim 21, wherein the inorganic binder is a water glass binder.

23. The composite material of claim 21, wherein the polymeric binder is a thermoplastic plastic, a thermosetting plastic, or an adhesive.

* * * * *